(12) United States Patent
Mori

(10) Patent No.: US 7,311,289 B2
(45) Date of Patent: Dec. 25, 2007

(54) MULTI-PURPOSE FOLDABLE STAND

(76) Inventor: Akio Mori, 5-8-406, Shibasakidai 4-chome, Abiko-shi, Chiba-ken (JP) 270-1176

(*) Notice: Subject to any disclaimer, the term of this patent is extended or adjusted under 35 U.S.C. 154(b) by 230 days.

(21) Appl. No.: 11/121,842

(22) Filed: May 5, 2005

(65) Prior Publication Data
US 2005/0258318 A1 Nov. 24, 2005

(30) Foreign Application Priority Data

| May 21, 2004 | (JP) | ............................. 2004-180320 |
| Aug. 28, 2004 | (JP) | ............................. 2004-280596 |
| Oct. 18, 2004 | (JP) | ............................. 2004-331201 |

(51) Int. Cl.
F16M 11/24 (2006.01)
F16M 11/00 (2006.01)

(52) U.S. Cl. .................... 248/165; 248/175; 248/440.1

(58) Field of Classification Search ................ 248/165, 248/175, 170, 173, 166–167, 163.1–163, 248/95, 97, 99, 100, 101
See application file for complete search history.

(56) References Cited

U.S. PATENT DOCUMENTS

| 3,015,024 | A | * | 12/1961 | Charchan et al. ........... 362/227 |
| 3,967,301 | A |   | 6/1976 | Corning |
| 3,985,069 | A |   | 10/1976 | Cavalluzzi |
| D248,402 | S |   | 7/1978 | Kittell |
| 4,224,168 | A |   | 9/1980 | Tragardh |
| D266,098 | S |   | 9/1982 | Thornton |
| 4,674,415 | A | * | 6/1987 | Smith ........................... 108/150 |
| 5,037,049 | A | * | 8/1991 | Funk ........................... 248/165 |
| D327,589 | S | * | 7/1992 | Ma ................................. D6/410 |
| D361,472 | S |   | 8/1995 | Heilicher |
| D367,153 | S |   | 2/1996 | Sturm |
| 5,496,007 | A |   | 3/1996 | Reece et al. |
| 5,826,843 | A |   | 10/1998 | Sturm |
| 5,873,195 | A | * | 2/1999 | Wortham ........................ 47/39 |
| 5,884,888 | A |   | 3/1999 | Grimes, III et al. |
| 5,934,014 | A | * | 8/1999 | Carrothers ..................... 47/39 |
| D419,034 | S |   | 1/2000 | Sturm |
| 6,045,107 | A |   | 4/2000 | Carlson |
| 6,334,593 | B2 | * | 1/2002 | Inoue ........................... 248/95 |
| 6,346,051 | B1 |   | 2/2002 | Otsubo |
| 6,425,167 | B1 |   | 7/2002 | Barbarite et al. |
| D513,154 | S | * | 12/2005 | Goodman et al. ........... D7/601 |
| 6,994,301 | B1 | * | 2/2006 | Fox .............................. 248/97 |
| 2002/0171021 | A1 |   | 11/2002 | Goretti |
| 2002/0185010 | A1 |   | 12/2002 | Spiteri |
| 2004/0124323 | A1 |   | 7/2004 | Kamenstein |
| 2005/0258318 | A1 | * | 11/2005 | Mori ........................... 248/175 |

* cited by examiner

Primary Examiner—Carl D. Friedman
Assistant Examiner—Tan Le

(57) ABSTRACT

A multi-purpose foldable stand is simple in structure and capable of being used on a table as a memo holder, a coffee filter holder, a book holder, and a banana holder, and when not in use, the stand is folded into a compact size for storage or carry. The stand has two identical U-shaped frames. Each of the frames includes a horizontal leg portion, an upright support portion, and a horizontal arm portion, to which spring clips or hooks are attached for suspending articles. Both of the upright support portions are pivotally bound together. When the stand is used, the frames are so pivoted that the horizontal leg portions form an angle of approximately 90 degrees with respect to each other, then memos, a coffee filter, a book, or bananas are suspended from the horizontal arm portions, and so the stand functions as the holder for the article suspended.

11 Claims, 8 Drawing Sheets

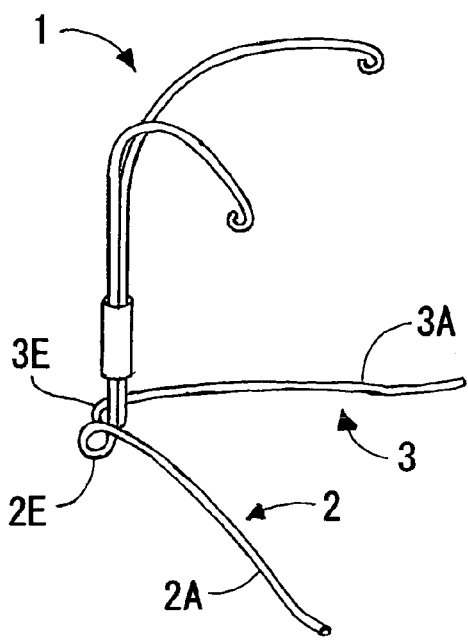
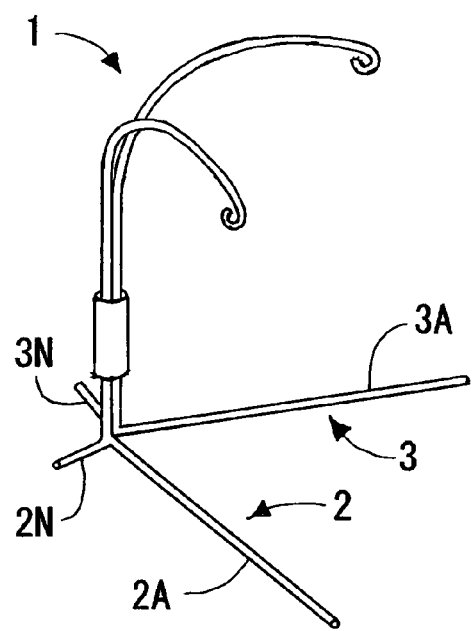
FIG. 8A  FIG. 8B
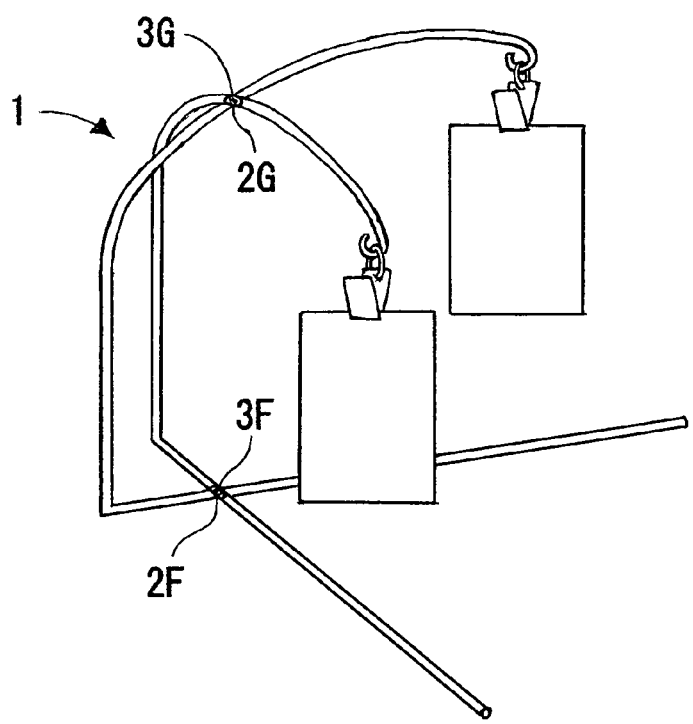
FIG. 9

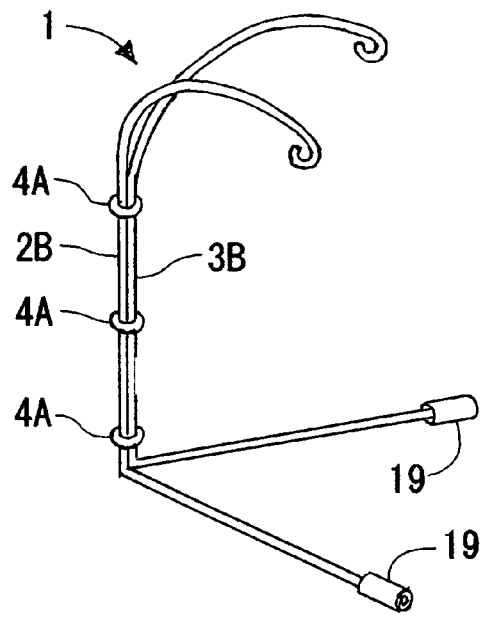
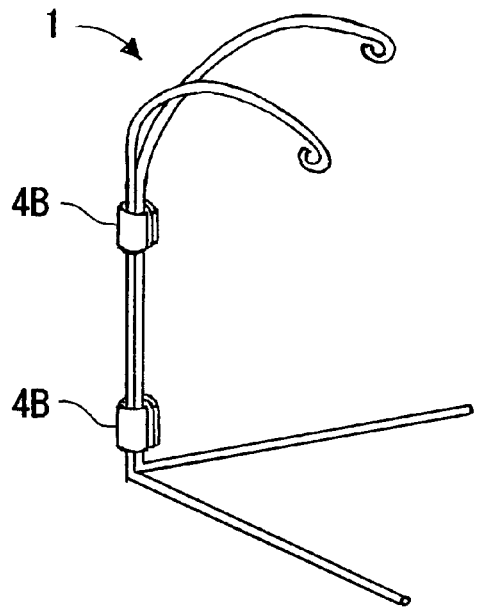
FIG. 10A          FIG. 10B
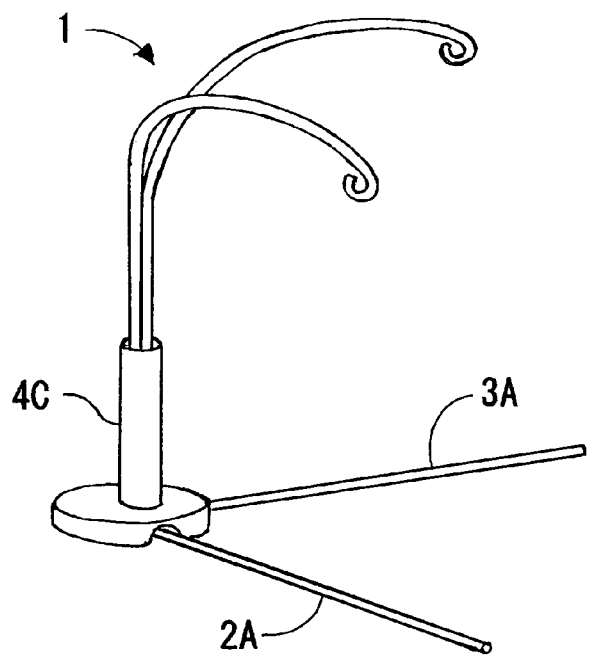
FIG. 11

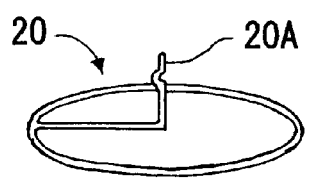
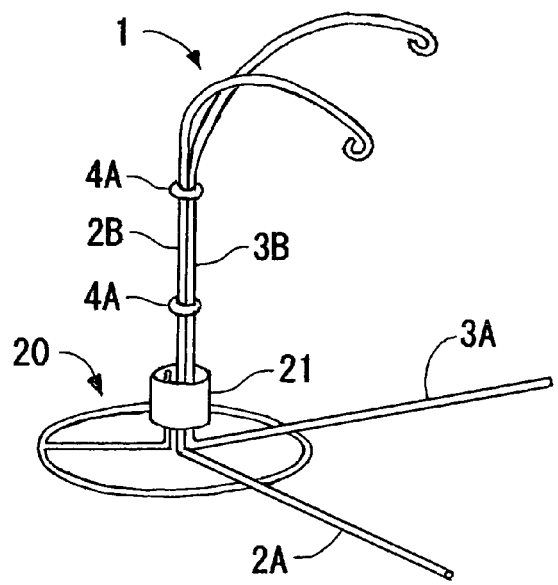
FIG. 12A      FIG. 12B
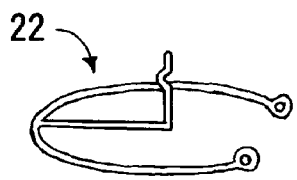
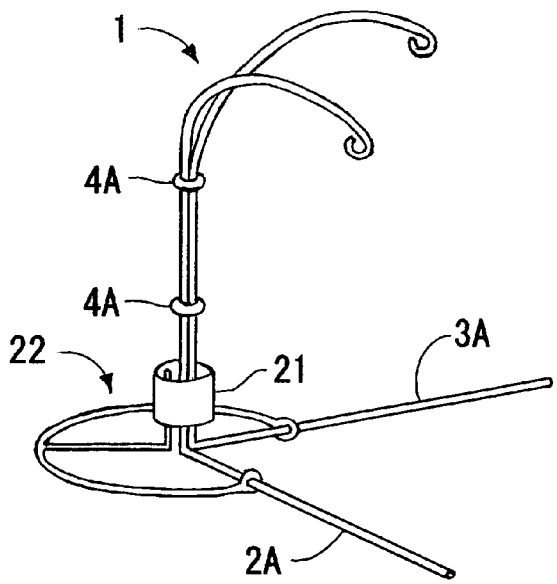
FIG. 13A      FIG. 13B

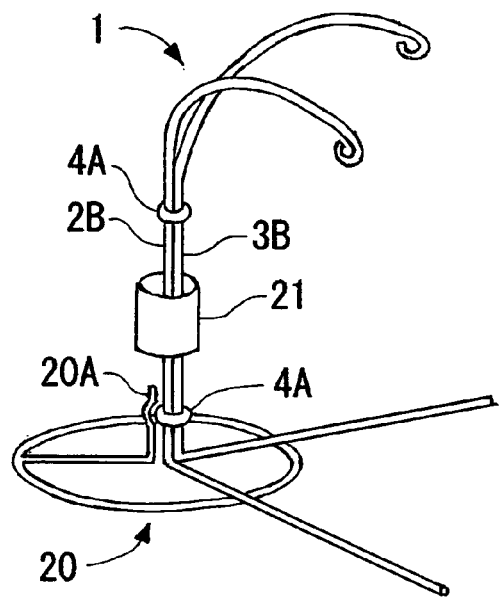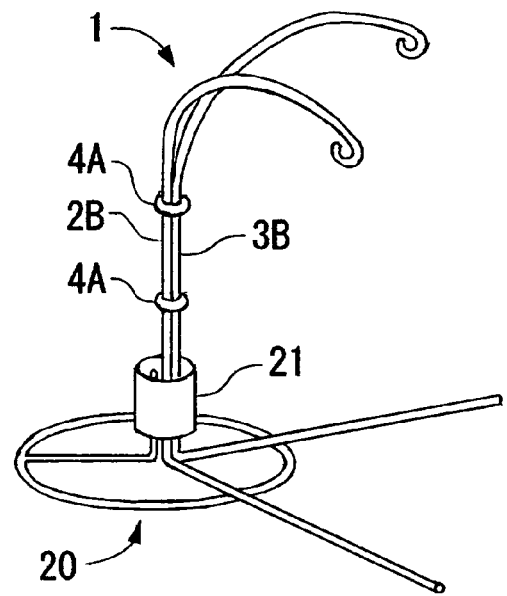
FIG. 14A  FIG. 14B
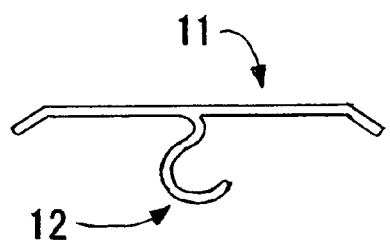
FIG. 15

MULTI-PURPOSE FOLDABLE STAND

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

1. Field of the Invention

The present invention relates generally to stands, and more specifically to a multi-purpose foldable stand used for suspending a variety of articles such as memos, coffee filter, book, and bananas.

2. Description of Related Art

There are various kinds of holders or stands used on a table. For example, memo holder, coffee filter holder, book holder, and banana holder are commonly used at home. However, each of the holders or stands generally has a single function. Therefore, when several kinds of holders or stands are used and left on a table for daily use, a lot of space on the table will be occupied. Furthermore, when not in use, the holders or stands need much space for storage because most of the holders or stands are not collapsible.

BRIEF SUMMARY OF THE INVENTION

It is therefore an object of the present invention to provide a multi-purpose foldable stand being simple in structure and capable of being used as a memo holder, a coffee filter holder, a book holder, and a banana holder.

The present invention comprises a pair of laterally-facing U-shaped pivot frame members for supporting articles to be suspended, each frame member of the pair is a single piece cylindrical rod, bent into U-shape and including the following segments in series: a horizontal leg portion lying in a horizontal plane, a linear upright support portion extending upwardly from the horizontal leg portion, a horizontal arm portion extending horizontally from the linear upright support portion, and an arm loop at an end of the horizontal arm portion. The horizontal leg portion and the horizontal arm portion define a plane. Spring clips or hooks are detachably connected to the arm loops of the frame members for suspending the articles. The frame members of the pair are pivotally connected together in back-to-back configuration.

When in use, the frame members are pivoted so as to the horizontal leg portions to form an angle of approximately 90 degrees with respect to each other, and the articles are suspended from the horizontal arm portions. For example, when memos, a coffee filter, a book, or bananas are suspended, the present invention can function as a memo holder, a coffee filter holder, a book holder, or a banana holder respectively. And when not in use, the frame members are pivoted to a storage position parallel to and adjacent to each other.

The present invention is simple in structure, light in weight, and foldable to a compact configuration for storage or carry, therefore, the present invention is useful not only at home but also at a camp especially when used as a coffee filter holder.

BRIEF DESCRIPTION OF THE SEVERAL VIEWS OF THE DRAWINGS

FIG. 4A shows the stand in use with a regular book and FIG. 4B shows the stand in use with a recipe book in a kitchen.

FIG. 5A shows the stand without bananas and FIG. 5B shows the stand in use with a bunch of bananas suspended.

FIGS. 8A and 8B are perspective views of alternative embodiments of the multi-purpose foldable stand having horizontal leg extensions at horizontal leg portions of frames. FIG. 8A shows the stand having the frames made of metal and FIG. 8B shows the stand having the frames made of plastic.

FIG. 9 is a perspective view of an alternative embodiment of the multi-purpose foldable stand having frames pivotally connected at horizontal leg portions and horizontal arm portions.

FIGS. 10A and 10B are perspective views of alternative embodiments of the multi-purpose foldable stand having band-like frame binders. FIG. 10A shows the stand having the frame binders made with wires and FIG. 10B shows the stand having the frame binders made with C-shaped plate springs.

FIG. 11 is a perspective view of an alternative embodiment of the multi-purpose foldable stand having a frame binder which keeps horizontal leg portions of frames of the stand at an angled position.

FIG. 12A is a perspective view of a stabilizer used for the multi-purpose foldable stand.

FIG. 12B is a perspective view of the multi-purpose foldable stand with the stabilizer and a stabilizer holder.

FIG. 13A is a perspective view of an alternative embodiment of the stabilizer of FIG. 12A.

FIG. 13B is a perspective view of the multi-purpose foldable stand with the stabilizer holder and the stabilizer of FIG. 13A, which keeps the horizontal leg portions of the frames at an angled position.

FIGS. 14A and 14B are perspective views of the multi-purpose foldable stand with the stabilizer of FIG. 12A and the stabilizer holder. FIG. 14A shows the stand right before the stabilizer is secured and FIG. 14B shows the stand immediately after the stabilizer is secured.

FIG. 15 is a perspective view of an alternative embodiment of an attachment bar and an attachment hook.

DETAILED DESCRIPTION OF THE INVENTION

Figure 1:
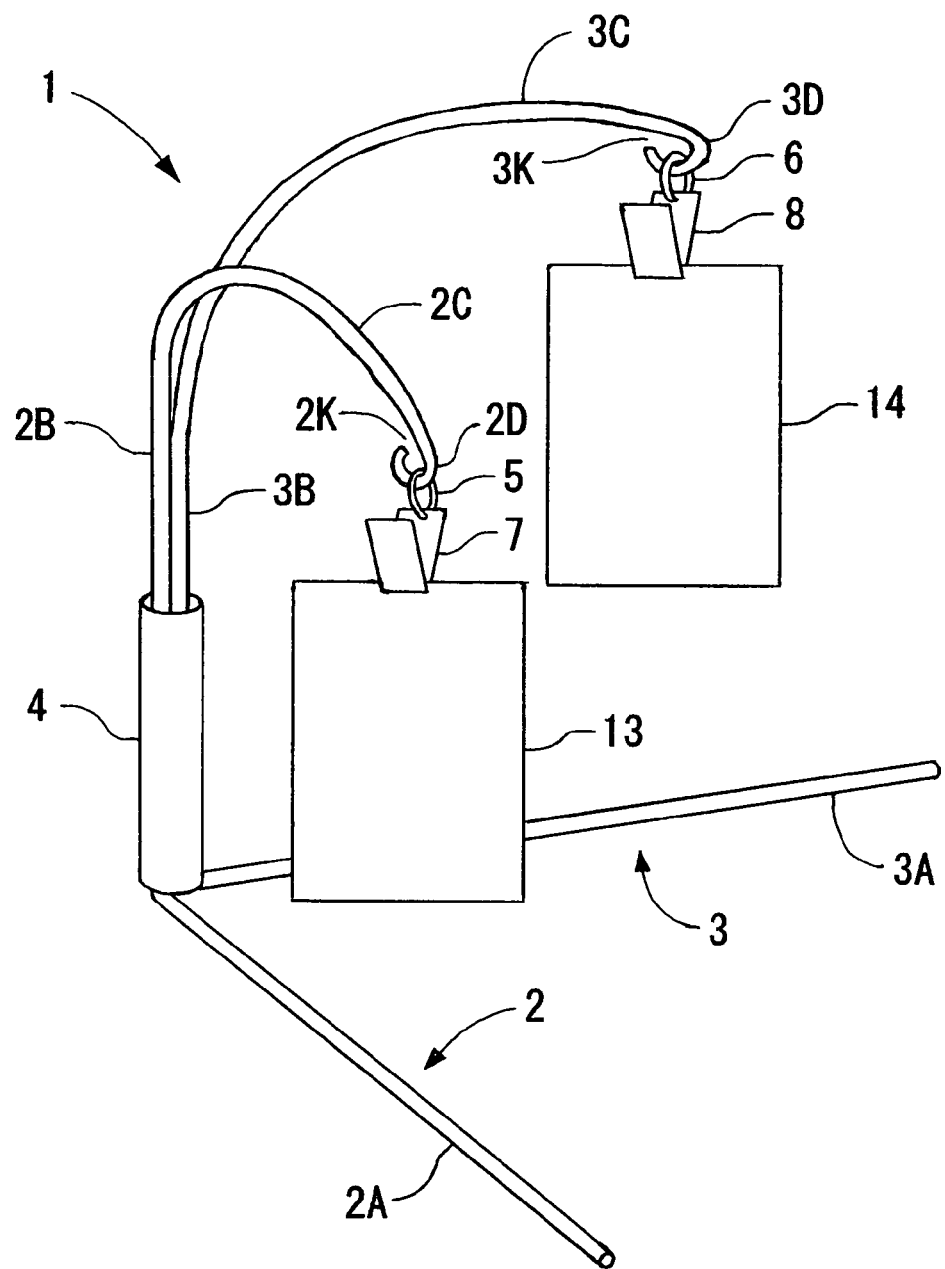
FIG. 1 is a perspective view of a multi-purpose foldable stand according to the present invention, showing the stand used as a memo holder.

Referring to FIG. 1, a perspective view of the present invention, the multi-purpose foldable stand 1 comprises basically a pair of identical U-shaped frames 2 and 3. Each of the frames 2 and 3 is generally formed by bending solid round metal bar or by plastic injection molding such that a size of a linear upright support portion 2B or 3B becomes approximately 8 inches in length. The frame 2 includes a horizontal leg portion 2A lying in a horizontal plane, the linear upright support portion 2B extending upwardly from the horizontal leg portion 2A, a horizontal arm portion 2C extending horizontally from the linear upright support portion 2B, and an arm loop 2D at an end of the horizontal arm portion 2C. The horizontal leg portion 2A and the horizontal arm portion 2C define a plane. Also the frame 3 includes a horizontal leg portion 3A, the linear upright support portion 3B, a horizontal arm portion 3C, and an arm loop 3D at an end of the horizontal arm portion 3C. The horizontal leg portion 3A and the horizontal arm portion 3C define a plane. The frames 2 and 3 are pivotally connected together in back-to-back or mirror-image configuration with a frame binder 4. The frame binder 4 has a cylindrical-shape, is made of metal or plastic, and binds the linear upright support portions 2B and 3B of the frames 2 and 3 together. Spring clips 7 and 8 are detachably connected to the arm loops 2D and 3D with attachment rings 5 and 6 respectively.

Referring again to FIG. 1, when the multi-purpose foldable stand 1 is used as a memo holder, the frames 2 and 3 are pivoted outward so that the horizontal leg portions 2A and 3A form an angle of approximately 90 degrees with respect to each other. Then memos 13 and 14 are suspended from the arm loops 2D and 3D with spring clips 7 and 8 respectively. Recipe cards, messages for family members, or any other kinds of memos may be suspended.

Figure 2:
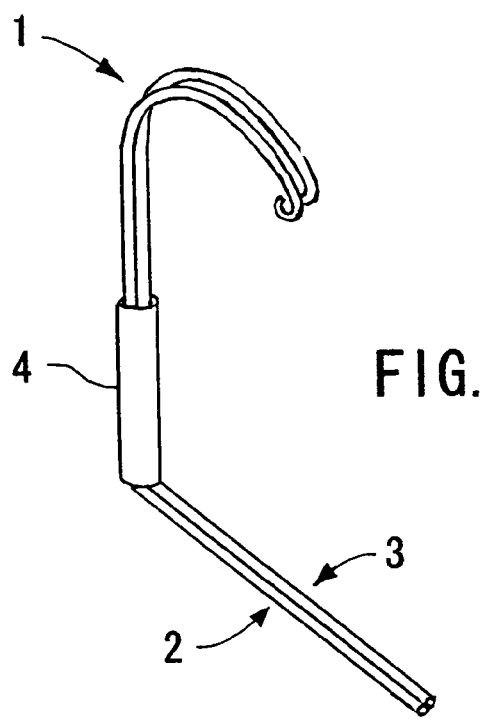
FIG. 2 is a perspective view of the multi-purpose foldable stand in a folded configuration for storage or carry.

Referring to FIG. 2, the frames 2 and 3 are pivoted from an angled position to a folded position with a single motion so that the multi-purpose foldable stand 1 has a compact configuration for storage or carry.

Figure 3:
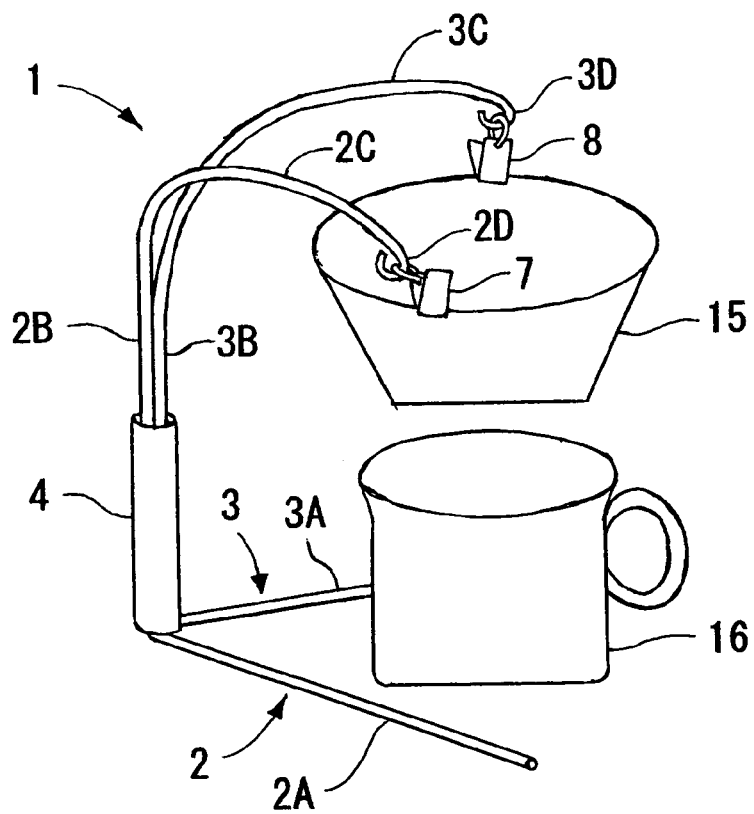
FIG. 3 is a perspective view of the multi-purpose foldable stand, showing the stand used as a coffee filter holder.

Referring to FIG. 3, when the multi-purpose foldable stand 1 is used as a coffee filter holder, tops of right and left sides of a coffee filter 15 are connected to the arm loops 2D and 3D with the spring clips 7 and 8 respectively, and a coffee cup 16 is placed beneath the coffee filter 15 to receive coffee dripped from the coffee filter 15 directly. In making drip-style coffee, generally, both a cone shaped coffee filter holder and a coffee filter are used. Firstly the cone shaped coffee filter holder is placed on a coffee cup, and secondly the coffee filter is placed inside of the cone shaped coffee filter holder. After making the coffee, the cone shaped coffee filter holder is washed for next use. However, the multi-purpose foldable stand 1 can save the effort of washing the cone shaped coffee filter holder because the multi-purpose foldable stand 1 does not need the cone shaped coffee filter holder. The multi-purpose foldable stand 1 is useful not only at home but also at a camp because the multi-purpose foldable stand 1 is simple in structure, light in weight, and foldable to a compact configuration for storage or carry.

Figure 4A:
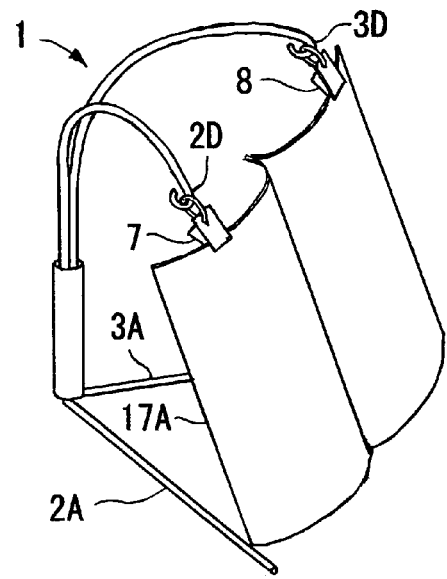
FIGS. 4A and 4B are perspective views of the multi-purpose foldable stand, showing the stand used as a book holder.
Figure 4B:
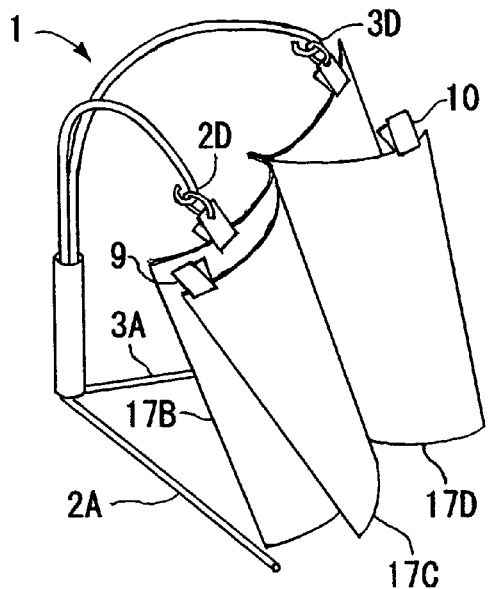

Referring to FIG. 4A, when the multi-purpose foldable stand 1 is used as a book holder, a regular book 17A is opened and tops of right and left sides of the regular book 17A are connected to the arm loops 2D and 3D with the spring clips 7 and 8 respectively. While a bottom of the regular book 17A is placed in a plane where the horizontal leg portions 2A and 3A are placed. FIG. 4B shows the multi-purpose foldable stand 1 in use with a recipe book 17B in a kitchen. Pages 17C and 17D, which are not referred, are bound with spring clips 9 and 10 respectively so that reference pages are easily accessed.

Figure 5A:
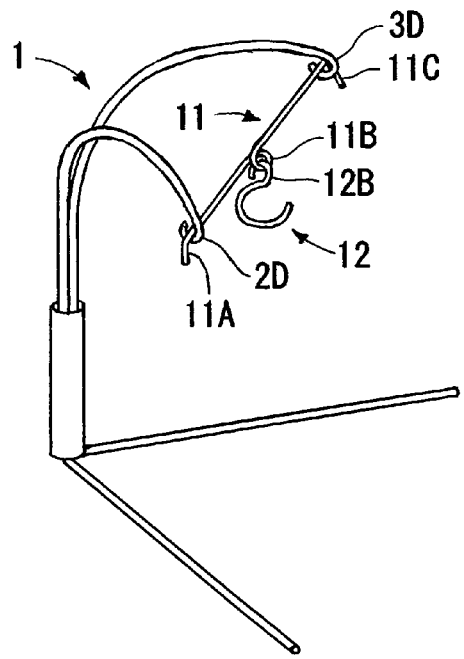
FIGS. 5A and 5B are perspective views of the multi-purpose foldable stand, showing the stand used as a banana holder.
Figure 5B:
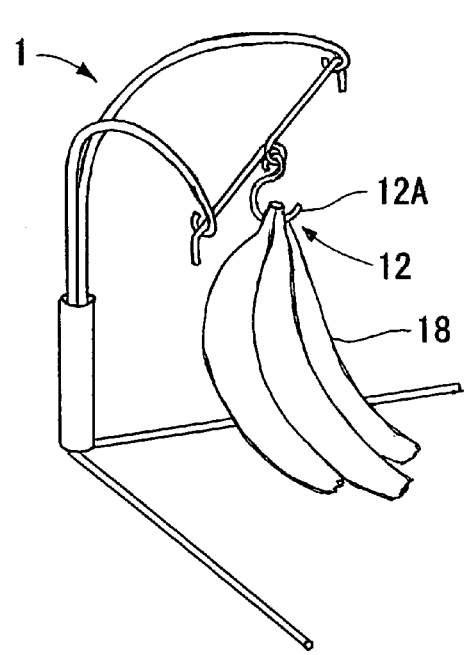

Referring to FIGS. 5A and 5B, when the multi-purpose foldable stand 1 is used as a banana holder, attachment bar ends 11A and 11C of an attachment bar 11 are hung on the arm loops 2D and 3D respectively, and an attachment hook end 12B of an attachment hook 12 is connected to an attachment bar loop 11B of the attachment bar 11. FIG. 5A shows the multi-purpose foldable stand 1 without bananas and FIG. 5B shows the multi-purpose foldable stand 1 after bananas 18 are hung on an attachment hook end 12A of the attachment hook 12. Banana is a tropical fruit and easily rotted by contact, therefore, banana holders are generally used at home for storage at room temperature, and also can be used for other fruits, which tend to be rotted by contact, such as grapes.

In the foregoing embodiment, the memos 13 and 14, the coffee filter 15, the books 17A and 17B, and the bananas 18 are shown as articles suspended from the arm loops 2D and 3D of the multi-purpose foldable stand 1. However, any other articles may also be suspend.

Furthermore, when the multi-purpose foldable stand 1 is in use with articles suspended from the arm loops 2D and 3D, the horizontal leg portions 2A and 3A must maintain an angled position. Referring again to FIG. 3, the horizontal leg portions 2A and 3A keep the angled position by frictional resistance between the frame binder 4 and the linear upright support portions 2B and 3B. Therefore, a size of inside diameter of the frame binder 4, in consideration of sizes of outside diameters of the linear upright support portions 2B and 3B, must be properly specified such that the frame binder 4 and the linear upright support portions 2B and 3B can get appropriate strength of frictional resistance. The term "appropriate strength" described above is used to indicate a certain level of the frictional resistance which can meet following two requirements. Firstly, when the horizontal arm portions 2C and 3C are grasped and pivoted outward, the horizontal leg portions 2A and 3A are also pivoted in synchronization with the horizontal arm portions 2C and 3C without any torsional deformation of the frames 2 and 3. Secondly, when the multi-purpose foldable stand 1 is used as a coffee filter holder, the horizontal leg portions 2A and 3A keep the angled position even though the suspended coffee filter 15 is filled with hot water. However, when the multi-purpose foldable stand 1 is used as a banana holder as shown in FIG. 5A, the angled position is kept with the attachment bar 11 which acts like a stopper. And when the multi-purpose foldable stand 1 is used as a book holder with a heavy book, the attachment bar 11 could be used additionally in order to keep the angled position of the horizontal leg portions 2A and 3A.

Referring again to FIG. 1, the frames 2 and 3 are preferably formed by bending solid round metal bars or by plastic injection molding. However, other materials such as metal tube or plastic bar could also be used. And the frame binder 4 could be comprised of two parts interlocked in order to bind the frames 2 and 3 easily.

In the foregoing embodiment as shown in FIG. 1, there are gaps 2K and 3K, through which the attachment rings 5 and 6 are hanged on the arm loops 2D and 3D, at ends of the arm loops 2D and 3D respectively. However, the gaps 2K and 3K could be closed after the attachment rings 5 and 6 are hanged on the arm loops 2D and 3D respectively in order to prevent the attachment rings 5 and 6 from being lost. The attachment rings 5 and 6 could be made of metal or plastic, or made with strings or chains.

Figure 6:
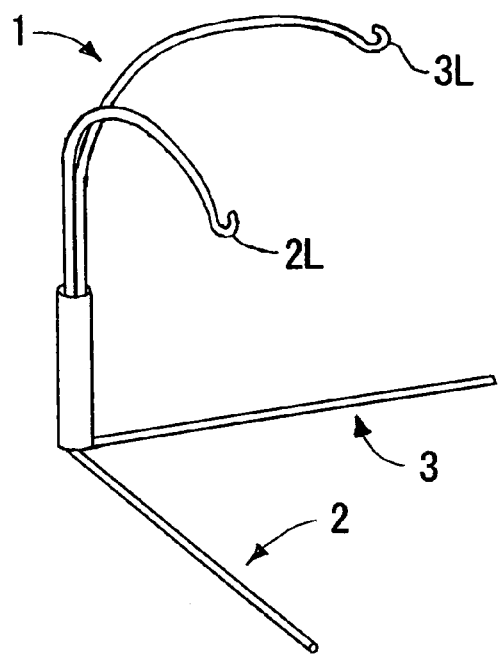
FIG. 6 is a perspective view of an alternative embodiment of the multi-purpose foldable stand having horizontal arm portions with U-shaped ends.
Figure 7A:
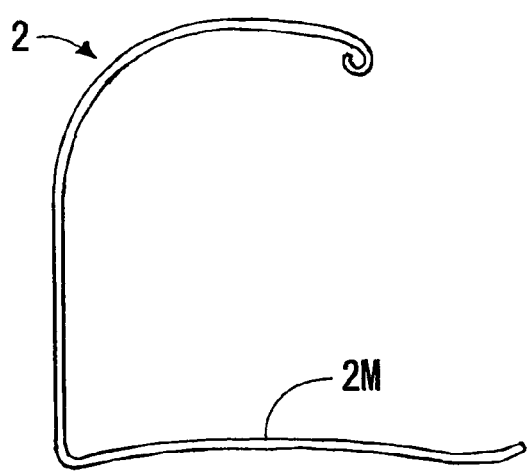
FIG. 7A is a side elevational view of an alternative embodiment of a frame of the multi-purpose foldable stand having a wave-shaped horizontal leg portion.
Figure 7B:
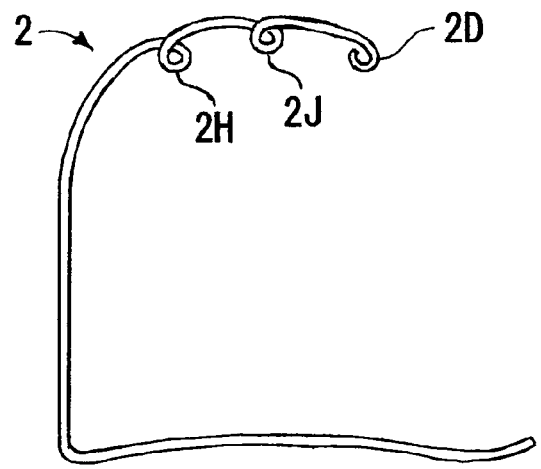
FIG. 7B is a side elevational view of an alternative embodiment of a frame of the multi-purpose foldable stand having a plurality of loops at a horizontal arm portion of the frame.

In the foregoing embodiment as shown in FIG. 1, the frames 2 and 3 have the arm loops 2D and 3D at ends of the horizontal arm portions 2C and 3C respectively. However, as shown in FIG. 6, the frames 2 and 3 could have U-shaped arm hooks 2L and 3L respectively. Also, in the foregoing embodiment as shown in FIG. 1, the frame 2 has the only one arm loop 2D. However, as shown in FIG. 7B, a plurality of arm loops 2D, 2J, and 2H could be formed. A plurality of memos could be suspended when the multi-purpose foldable stand 1 is used as a memo holder.

In the foregoing embodiment as shown in FIG. 1, the horizontal leg portions 2A and 3A have linear shapes. However, as shown in FIG. 7A, each of the frames 2 and 3 could have a wave shaped horizontal leg portion 2M. When the multi-purpose foldable stand 1 with the wave shaped horizontal leg portions is placed astride on a table, the multi-purpose foldable stand 1 could get a good stability in an upright position because only three points of the wave shaped horizontal leg portions are made contact with the table. The wave shaped horizontal leg portions could also prevent a surface of the table from being scratched.

In addition to the wave shaped horizontal leg portions described above, the horizontal leg portions 2A and 3A could have horizontal leg extensions 2E and 3E as shown in FIG. 8A in order to prevent the multi-purpose foldable stand 1 from falling backward when in use. FIG. 8A shows the frames 2 and 3 with horizontal leg extensions 2E and 3E formed by bending solid round metal bars. FIG. 8B shows the frames 2 and 3 with horizontal leg extensions 2N and 3N formed by plastic injection molding.

In the foregoing embodiment as shown in FIG. 1, the frames 2 and 3 are pivotally connected together in back-to-back or mirror-image configuration with a frame binder 4. The frame binder 4 has a cylindrical-shape and binds the linear upright support portions 2B and 3B of the frames 2 and 3 together. However, as shown in FIG. 9, the frames 2 and 3 could have horizontal leg pivot joints 2F and 3F and horizontal arm pivot joints 2G and 3G in order that the multi-purpose foldable stand 1 could get a good stability in an upright position.

In the foregoing embodiment as shown in FIG. 1, the frame binder 4 has a cylindrical shape and made of metal or plastic. However, some flexible materials such as vinyl tube, rubber tube, or coil spring could be used for the frame binder 4. In an assembly process of the multi-purpose foldable stand 1, when a cylindrical frame binder made of metal or plastic is used, two linear cylindrical rods must be put through the cylindrical frame binder first, then each of the linear cylindrical rods is bent into U-shape to form a frame. On the contrary, if a flexible tubular frame binder is used, even U-shaped frames could be put through the flexible tubular frame binder.

Furthermore, instead of using the flexible tubular frame binder described above, other materials such as wires, rubber bands, plastic bands, or C-shaped plate springs could be used for the frame binder. FIG. 10A shows the multi-purpose foldable stand 1 having frame binders 4A, which are made with wires, and with which the linear upright support portions 2B and 3B are bound together at three points, upper, middle, and lower portions. FIG. 10A also shows horizontal leg caps 19, which are made with certain tubular material having a high coefficient of friction such as silicon rubber tube, and attached to ends of the horizontal leg portions 2A and 3A in order to prevent the multi-purpose foldable stand 1 from slipping laterally. FIG. 10B shows the multi-purpose foldable stand 1 having frame binders 4B made with C-shaped plate springs.

Referring to FIG. 11, a double-deck frame connector 4C could be used for keeping an angled position of the horizontal leg portions 2A and 3A. The horizontal leg portions 2A and 3A are set in grooves on bottom surface of the double-deck frame connector 4C. The double-deck frame connector 4C is slid upwardly when the multi-purpose foldable stand 1 is folded.

Referring to FIG. 12B, when the multi-purpose foldable stand 1 is placed astride on a table and used regularly, a stabilizer 20 could be used for improving a stability in an upright position of the multi-purpose foldable stand 1. FIG. 12A shows the stabilizer 20, which is generally formed by bending solid round metal bar or by plastic injection molding. The stabilizer 20 has an inverted T-shape and includes a horizontal plate portion and a vertical bar portion 20A. The horizontal plate portion sustains the multi-purpose foldable stand 1. The vertical bar portion 20A is attached to the linear upright support portions 2B and 3B of the multi-purpose foldable stand 1. The horizontal plate portion is generally formed by bending solid round metal bar or by plastic injection molding and may have any shapes such as a circle, a square, or a triangle. The vertical bar portion 20A is extended upwardly from a central part of the horizontal plate portion, and has a straight shape or a certain shape which fit with a shape of combined the linear upright support portions 2B and 3B, and the frame binder 4A.

FIG. 12B shows the stabilizer 20 secured to the multi-purpose foldable stand 1 with a stabilizer holder 21. FIG. 13A shows a stabilizer 22, which can keep an angled position of the horizontal leg portions 2A and 3A. FIG. 13B shows the stabilizer 22 secured to the multi-purpose foldable stand 1.

The stabilizer holder 21 includes an inner pipe and an outer tube. The inner pipe is made of metal or plastic, or made with a coil spring. The outer tube is made of certain flexible material having a high coefficient of friction such as silicon rubber. The outer tube is longer than the inner pipe and the inner pipe is inserted into the outer tube such that a lower portion of the stabilizer holder 21 includes the outer tube only. When the stabilizer 20 is attached to the multi-purpose foldable stand 1, firstly, as shown in FIG. 14A, the vertical bar portion 20A of the stabilizer 20 and the linear upright support portions 2B and 3B of the multi-purpose foldable stand 1 are placed side by side while the stabilizer holder 21 is slid up. Secondly, as shown in FIG. 14B, the stabilizer holder 21 is slid down so that the vertical bar portion 20A of the stabilizer 20 is inserted into the inner pipe of the stabilizer holder 21. Thirdly, a little more force is added to the stabilizer holder 21 downward so that the stabilizer holder 21 is slid downward some more and the frame binder 4A, which is located at a lower portion of the linear upright support portions 2B and 3B, is covered with the outer tube of the lower portion of the stabilizer holder 21. Thus, the stabilizer 20 is securely attached to the multi-purpose foldable stand 1, and the stabilizer 20 does not fall off because of frictional resistance between the vertical bar portion 20A of the stabilizer 20 and the outer tube of the lower portion of the stabilizer holder 21 even if the multi-purpose foldable stand 1 is lifted up.

Referring to FIG. 15, the attachment bar 11 and the attachment hook 12, which are used when the multi-purpose foldable stand 1 is used as a banana holder, may be united.

What is claimed is:

1. A multi-purpose foldable stand capable of being used as a memo holder, a coffee filter holder and a book holder, comprising:

a pair of laterally-facing U-shaped pivot frame members for supporting articles to be suspended, each frame member of said pair including a horizontal leg portion lying in a horizontal plane, a linear upright support portion extending upwardly from said horizontal leg portion, and a horizontal arm portion extending from an upper end of said linear upright support portion in a direction parallel to said horizontal leg portion, said articles being hung from said horizontal arm portion;

frame rotation support means for binding both said linear upright support portions of said frame members together such that said frame members, with said linear upright support portions of said frame members as an axis of rotation, are allowed pivotal movement with respect to each other from a parallel position to an angled position, said frame rotation support means enables said frame members to be so pivoted that said horizontal leg portions of said frame members form an angle of approximately 90 degrees with respect to each other when in use and an angle of nearly zero degree when not in use, said frame rotation support means comprises a plurality of wires;

article suspension support means to be attached to an article and suspended from said horizontal arm portion of said frame member, said article suspension support means having a first end and a second end, and said first end of said article suspension support means having fastening means suitable for attaching to said article, and said second end of said article suspension support means being detachably connected to said horizontal arm portion of said frame member, said fastening means of said first end of said article suspension support means comprises a spring clip;

a stabilizer assembly to be attached to said linear upright support portions of said frame members for preventing said frame members from falling backward when in use, said stabilizer assembly comprising:

an inverted T-shaped stabilizer having a horizontal plate portion for sustaining said frame members and a vertical bar portion extending upwardly from said horizontal plate portion, said vertical bar portion being attached to said linear upright support portions of said frame members; and a cylindrical stabilizer holder for attaching said inverted T-shaped stabilizer to said frame members, said cylindrical stabilizer holder being connected to a lower portion of said linear upright support portions of said frame members, said vertical bar portion of said inverted T-shaped stabilizer being inserted into said cylindrical stabilizer holder, thereby said inverted T-shaped stabilizer being securely attached to said frame member;

whereby said multi-purpose foldable stand can function as said memo holder when memos are suspended from said horizontal arm portions of said frame members in an angled position, and said multi-purpose foldable stand can function as said coffee filter holder used for making drip-style coffee when tops of right and left sides of a coffee filter are connected to said horizontal arm portions of said frame members, and said multi-purpose foldable stand can function as said book holder when tops of right and left sides of an open book are connected to said horizontal arm portions of said frame members while a bottom of said open book is placed in a plane where said horizontal leg portions of said frame members being placed.

2. The multi-purpose foldable stand according to claim 1, in which said frame rotation support means comprises a plurality of C-shaped plate springs.

3. A multi-purpose foldable stand capable of being used as a memo holder, a coffee filter holder, a book holder, and a banana holder, comprising:

a pair of U-shaped pivot frame members for supporting articles to be suspended, each frame member of said pair including a horizontal leg portion lying in a horizontal plane, a linear upright support portion extending upwardly from said horizontal leg portion, and an arched horizontal arm portion extending from an upper end of said linear upright support portion, said horizontal leg portion and said arched horizontal arm portion defining a plane, said articles being hung from said arched horizontal arm portion;

frame rotation support means for receiving said linear upright support portions of said frame members for rotation therein, whereby said frame members being pivoted outward and inward, said frame rotation support means enables said frame members to be so pivoted that said horizontal leg portions of said frame members form an angle of approximately 90 degrees with respect to each other when in use and an angle of nearly zero degree when not in use, said frame rotation support means comprises a plurality of wires;

article suspension support means to be attached to an article and suspended from said arched horizontal arm portion of said frame member, said article suspension support means having a first end and a second end, and said first end of said article suspension support means having fastening means suitable for attaching to said article, and said second end of said article suspension support means being detachably connected to said arched horizontal arm portion of said frame member;

a stabilizer assembly to be attached to said linear upright support portions of said frame members for preventing said frame members from falling backward when in use, said stabilizer assembly comprising:

an inverted T-shaped stabilizer having a horizontal plate portion for sustaining said frame members and a vertical bar portion extending upwardly from said horizontal plate portion, said vertical bar portion being attached to said linear upright support portions of said frame members; and a cylindrical stabilizer holder for attaching said inverted T-shaped stabilizer to said frame members, said cylindrical stabilizer holder being connected to a lower portion of said linear upright support portions of said frame members, said vertical bar portion of said inverted T-shaped stabilizer being inserted into said cylindrical stabilizer holder, thereby said inverted T-shaped stabilizer being securely attached to said frame members;

whereby said multi-purpose foldable stand can function as said memo holder, said coffee filter holder, said book holder, and said banana holder when memos, a coffee filter, a book, and bananas are suspended from said arched horizontal arm portions of said frame members respectively.

4. The multi-purpose foldable stand according to claim 3, in which said frame rotation support means comprises a plurality of C-shaped plate springs.

5. The multi-purpose foldable stand according to claim 3, in which said fastening means of said first end of said article suspension support means comprises a spring clip.

6. The multi-purpose foldable stand according to claim 3, in which said fastening means of said first end of said article suspension support means comprises a J-shaped hook.

7. A multi-purpose foldable stand capable of being used as a memo holder, a coffee filter holder, a book holder, and a banana holder, comprising:
  a pair of U-shaped frame members for supporting articles to be suspended, each frame member of said pair including a horizontal leg portion lying in a horizontal plane, a linear upright support portion extending upwardly from said horizontal leg portion, and a horizontal arm portion extending from an upper end of said linear upright support portion, said horizontal leg portion and said horizontal arm portion defining a plane, said articles being hung from said horizontal arm portion;
  frame rotation support means for binding both said linear upright support portions of said frame members together such that said frame members, with said linear upright support portions of said frame members as an axis of rotation, are allowed pivotal movement with respect to each other from a parallel position to an angled position, said frame rotation support means enables said frame members to be so pivoted that said horizontal leg portions of said frame members form an angle of approximately 90 degrees with respect to each other when in use and an angle of nearly zero degree when not in use;
  article suspension support means to be attached to an article and suspended from said horizontal arm portion of said frame member, said article suspension support means having a first end and a second end, and said first end of said article suspension support means having fastening means suitable for attaching to said article, and said second end of said article suspension support means being detachably connected to said horizontal arm portion of said frame member;
  a stabilizer assembly to be attached to said linear upright support portions of said frame members for preventing said frame members from falling backward when in use, said stabilizer assembly comprising:
  an inverted T-shaped stabilizer having a horizontal plate portion for sustaining said frame members and a vertical bar portion extending upwardly from said horizontal plate portion, said vertical bar portion being attached to said linear upright support portions of said frame members; and
  a cylindrical stabilizer holder for attaching said inverted T-shaped stabilizer to said frame members, said cylindrical stabilizer holder being connected to a lower portion of said linear upright support portions of said frame members, said vertical bar portion of said inverted T-shaped stabilizer being inserted into said cylindrical stabilizer holder, thereby said inverted T-shaped stabilizer being securely attached to said frame member;
  whereby said multi-purpose foldable stand can function as said memo holder, said coffee filter holder, said book holder, and said banana holder when memos, a coffee filter, a book, and bananas are suspended from said horizontal arm portions of said frame members respectively.

8. The multi-purpose foldable stand according to claim 7, in which said frame rotation support means comprises a plurality of C-shaped plate springs.

9. The multi-purpose foldable stand according to claim 7, in which said fastening means of said first end of said article suspension support means comprises a spring clip.

10. The multi-purpose foldable stand according to claim 7, in which said fastening means of said first end of said article suspension support means comprises a J-shaped hook.

11. The multi-purpose foldable stand according to claim 7, in which said frame rotation support means comprises a plurality of wires.

* * * * *